United States Patent [19]

Vannet et al.

[11] Patent Number: 4,722,017
[45] Date of Patent: * Jan. 26, 1988

[54] STATIC REDUCTION IN MAGNETIC RECORD DISK ASSEMBLIES

[75] Inventors: Wayne H. Vannet, Oakdale; John D. Hakanson, South St. Paul; Gerald J. Niles, St. Paul, all of Minn.

[73] Assignee: Minnesota Mining and Manufacturing Company, St. Paul, Minn.

[*] Notice: The portion of the term of this patent subsequent to Feb. 11, 2003 has been disclaimed.

[21] Appl. No.: 817,395

[22] Filed: Jan. 9, 1986

[51] Int. Cl.$^4$ .............................................. G11B 23/03
[52] U.S. Cl. ...................................... 360/133; 428/922
[58] Field of Search ...................... 360/133, 132, 131; 428/922

[56] References Cited

U.S. PATENT DOCUMENTS

| | | | |
|---|---|---|---|
| 4,038,693 | 7/1977 | Huffine et al. | 360/99 |
| 4,251,843 | 2/1981 | Masuyama et al. | 360/133 |
| 4,345,284 | 8/1982 | Saito | 360/132 |
| 4,354,213 | 10/1982 | Martinelli | 360/133 |
| 4,570,197 | 2/1986 | Hakanson et al. | 360/133 |
| 4,604,672 | 8/1986 | Davis et al. | 360/133 |

OTHER PUBLICATIONS

Alstad et al., "Diskette," IBM Technical Disclosure Bulletin, vol. 26, No. 7B, Dec. 1983, p. 3952.
Olson, "Floppy Diskette Liner," IBM Technical Disclosure Bulletin, vol. 25, No. 7B, Dec. 1982, p. 3967.

*Primary Examiner*—John H. Wolff
*Assistant Examiner*—Matthew J. Bussan
*Attorney, Agent, or Firm*—Donald M. Sell; James A. Smith; Mark A. Litman

[57] ABSTRACT

Triboelectric charging of magnetic record disk jackets causes static electricity to attract and hold foreign matter. This triboelectric charging can be reduced by the application of nonvolatile, non-integral, electrically conductive organic coatings on the surfaces of the jackets.

20 Claims, No Drawings

STATIC REDUCTION IN MAGNETIC RECORD DISK ASSEMBLIES

FIELD OF THE INVENTION

The present invention relates to a device and method for the reduction of static charge buildup in magnetic record disk assemblies. A nonvolatile, organic, conductive coating composition is applied to at least one surface and preferably at least the exterior surface of the jacket component of the disk assembly, dramatically reducing an unrecognized harmful form of static charge buildup on the assembly.

BACKGROUND OF THE INVENTION

The problems of triboelectric charging and other forms of static charge buildup have long provided problems in various commercial areas. A large number of various methods have been developed over the years for dealing with this problem. Amongst the various techniques used to reduce electrostatic charge buildup are the application of conductive film coatings to surfaces, the inclusion of conductive particulate matter or fibers within the composition, the matching of work functions of surfaces in movable contact with each other, exterior grounding of surfaces subject to charge, and even coating with compositions that suppress spark discharge. Each of these procedures has its own advantages and disadvantages, but are generally regarded in the art as equivalent in their ability to reduce static charge buildup.

Certain problems relating to static charge buildup on rotary magnetic disk record assemblies have already been noted and solved. U.S. Pat. No. 4,354,213 discloses the use of a porous, fibrous, low-friction, antistatic liner material with a lubricant thereon between the rotating circular disk and the interior surface of the jacket. This antistatic layer reduces triboelectric charge buildup from the motion of the rotating disk against the jacket or the liner.

U.S. Pat. No. 4,038,693 discloses the use of an electrically conductive layer on the inside surface of the jacket for draining away electrostatic charge on the jacket. Materials such as high carbon black content inks are shown for use in forming the dry interior layer.

BRIEF DESCRIPTION OF THE INVENTION

The present invention provides for an improved method of reducing electrostatic charge buildup on magnetic record disk assemblies by the application of liquid, nonvolatile, electrically conductive, organic coating compositions to at least one surface of the jacket of the assembly and preferably the exterior surface of the jacket. The coating composition is preferably applied to all surfaces of the jacket. The coating composition is a nonintegral, non-film-forming composition which is applied to both interior and exterior surfaces and components in the jacket. The coating composition may be film-forming on the exterior surface of the jacket only.

DETAILED DESCRIPTION OF THE INVENTION

Magnetic record disks are stored in various types of assemblies for their use in various fields within the industry. Various sizes and formats of disks and assemblies are presently used. These assemblies have traditionally been plagued with a problem of electrostatic charging during both manufacture and use. During manufacture, the molding and handling operations used to form the jacket and insert the disk in the jacket have caused generation of triboelectric charges within the assembly. These types of static problems have been recognized and at least partly addressed by the industry. When the assembly is transported to the operating station where the assembly is inserted into the disk drive mechanism, problems can be encountered because of the residual or developed charge passed to the exterior of the jacket directly from the hands of the user. This form of accumulated charge has not been previously recognized or addressed. Particulate matter, such as dust, is often attracted onto the exterior of the jacket and is carried into the interior of the disk drive and magnetic readout equipment as the disk assembly is inserted. The dust can cause both aesthetic and functional problems with the use of the disk. During use of disk assemblies, static charge buildup on the exterior surface can again attract particulate matter into and onto the jacket. The presence of dust on the jacket itself can harm both the disk and the magnetic heads which read the disk. The appearance of dust on the disk assembly and the disk provides an unattractive and worrisome appearance to the user.

Previous solutions to particular static problems have been limited in their effect. Additional problems first recognized by the inventors have not been solved or addressed by the prior art. In particular, it has been found that static buildup on the exterior surface of the jacket can be discharged through an inadvertent path leading to the recording head or other associated electronic circuits. At a minimum, this can diminish the quality of information on the disk. In the extreme case, such discharge can cause permanent damage to the equipment and circuitry. This problem has not been heretofore recognized.

The use of carbon black loaded polymer layers, or other solid integral coatings has one drawback. If the layer is scratched or gouged down to the base, a gap is formed across which there is no conductivity. With the non-integral and liquid compositions of the present invention, the conductive material can slowly flow or redistribute itself over any scratched area, repairing the area where the antistatic material was removed.

As noted above, jackets presently are made with conductive materials included within the composition of the jacket and on the interior surface of the jacket. Furthermore, the conductive materials used on the interior surface are only disclosed as dry solid film materials such as carbon black in a binder. This moderately reduces the residual charge which disk assemblies can maintain, but residual charging within the jacket is still quite common and high residual charging on the exterior surface can still occur. The application, according to the present invention, of a nonvolatile, conductive, organic coating composition to the surfaces of the jacket of a record disk assembly has been found to be able to consistently reduce the residual charge in disk assemblies to less than 500 volts. Generally, electrostatic charging is held to less than 200 or even less than 100 volts in such disk assemblies. The residual charge is that charge retained on the body after charging of the body and exposure to air at 20° C. and 30 percent relative humidity for 20 hours.

The conductive coating composition of the present invention has been referred to as "nonvolatile". In the practice of the present invention this means that, after evaporation of any solvents, less than 2 percent by weight per week of the coating composition will evaporate off the surface of an article at 25° C. and 40 percent relative humidity. Preferably less than 1 percent by weight per week would evaporate and, more preferably, less than 0.1 percent by weight per week would evaporate at those temperatures and conditions.

The greater the percentage of surfaces of the jacket on and within the jacket that are coated with the organic, conductive coating compositions of the present invention, the greater the general reduction in electrostatic charging. This does not necessarily mean that greater amounts of the coating composition better reduce the electrostatic charging, but rather that it is important to insure the coating of as much surface areas as possible in and on the jacket. Thus both interior and exterior surfaces of the jacket should be coated. As the coating composition is likely to come in contact with the magnetic recording equipment, which is not necessarily preferred, the coating composition should be applied so as to not be present in such excess amounts as would readily flow from a surface of the jacket onto the equipment. The coating composition should generally be applied so as to provide a dry (without solvent) coating weight of between 0.5 (0.08 micrograms per square centimeter) and 250 micrograms per square inch (40 micrograms per square centimeter) as an average coating weight. Because the coating composition will not necessarily spread uniformly over the coated surface, or because of surface structure variations (such as embossed non-glare surface), it is the average coating weight that must be considered in this range. If less than this amount of material is applied, insufficient antistatic protection will be provided. If greater than this amount is applied, no further antistatic protection is obtained, and an undesirable, highly greasy appearance will be provided to the coated article. Preferably a coating weight of 1-100 micrograms per square inch (0.16 to 16 micrograms per square centimeter) is used or more preferably 1-50 micrograms per square inch (0.16 to 8 micrograms per square centimeter). In the most preferred pratice of the invention, 5-30 micrograms per square inch of the coating composition is used.

The organic coating composition useful in the practice of the present invention may be any nonvolatile, organic, electrically conductive composition. It is highly preferred that the coating is nonintegral or liquid as this provides the greatest static reduction. By "nonintegral" it is meant that the composition does not form a self-supporting solid film when air dried, as it would be when present on the surface of the jacket. The term nonintegral therefore excludes the provision of a solid, thermoplastic or nonliquid conductive coating composition to the surface of the jacket. Useful conductive coating compositions include the many antistatic agents and systems already known in the art including long chain alkyl quaternary amines, long chain alkyl quaternary phosphines, fluorinated antistatic materials, low molecular weight polymers or oligomers having pendant antistatic ionic groups such as quaternary amine groups, and other ionic, organic materials known for antistatic purposes in the art. The preferred material according to the practice of the present invention for use as an antistatic coating composition is the composition of U.S. Pat. No. 4,313,978. This particular composition provides extremely long lasting and high efficiency antistatic protection for magnetic record disk jackets.

That antistatic composition comprises a fluorinated anionic surfactant which is an amine salt of an acid containing a fluorinated organic radical (as defined herein) and an antistatic agent which is an ionic salt of an amine. It has been found that the combination of the fluorinated surfactant and antistatic agent can provide a reduction in static charging at very low application amounts.

The surfactants used in that preferred composition of the present invention are anionic fluorocarbon surfactants which are the amine salts of acids containing a fluorinated organic radical. The preferred surfactants may generally be depicted by the formula:

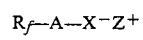

$$R_f-A-X^-Z^+$$

in which $R_f$ represent a fluorinated organic radical (as defined herein),

A represents a bond or a divalent linking group, $X^-$ represents an acid anion, and $Z^+$ represents a quaternary ammonium cation.

The fluorinated organic radical $R_f$ is defined as a radical which is a saturated, aliphatic radical having from 2 to 20 and preferably at least 3 carbon atoms, the skeletal chain of which may be straight, branched or, if sufficiently large, cycloaliphatic. The skeletal chain may be interrupted by divalent oxygen or trivalent nitrogen atoms bonded only to carbon atoms provided the radical does not contain more than one heteroatom, i.e., nitrogen or oxygen, for every two carbon atoms in the skeletal chain the radical being fully fluorinated with the exception that it may contain hydrogen or chlorine atoms as substituents provided that not more than one atom of either is present in the radical for each carbon atom. Preferably, the fluoroaliphatic radical is a perfluoroalkyl radical having a skeletal chain that is straight or branched.

The fluorinated organic radical is linked to the acid anion either by a direct bond or through the divalent linkage A. Preferably the chain of the linking group A is composed of carbon atoms although heteroatoms, e.g., nitrogen or oxygen, may be present provided they do not interfere with the ionic nature of the surfactant. Preferred linking groups are alkylene groups.

Particularly suitable acid anions $X^-$ include carboxylic acid and sulfonic acid groups.

Examples of suitable fluorinated organic radical containing anions $R_f-A-X^-$ include 5 to 18 carbon atom perfluorinated alkyls such as perfluoropentyl sulfonate and perfluoro-octylcarboxylate.

The quaternary ammonium groups $Z^+$ are derived from the corresponding amine. Suitable amines include aliphatic amines and aliphatic cyclic amines, which may optionally be substituted with substituents which will not affect the ionic nature of the surfactant. Preferably the amines contain 2 to 12 carbon atoms. Suitable amines include piperidine, dimethylaminoethanol, morpholine, triethanolamine and triethylamine.

Other suitable surfactants include those containing 2 or more acid anions and quaternary ammonium cations in which the acid anions are bonded directly to the fluorinated organic radical or via one or more linking groups. Preferably the fluorinated organic radical is pendant although it may be present within the molecule as in the case of the amine salts of $(C_2F_4COOH)_2$ and $(C_2F_4SO_3H)_2$. Anionic surfactants containing two or more fluorinated organic radicals may also be used.

The antistatic agent used in the preferred compositions is an ionic salt of an amine. The compounds have the property that they induce conductivity to the surface upon which they are applied. Suitable amines include those from which the quaternary ammonium groups $Z^+$ are derived. The anionic portion of the antistatic agent may be chosen from a wide variety of anions including halide, sulfate, aryl sulfonate, aliphatic sulfonate, aryl carboxylate and aliphatic carboxylate. The anions may contain further substituents providing they do not affect the antistatic properties of the compound, for example, the presence of nitrogen atoms and highly fluorinated radicals is undesirable in the anion.

Specific examples of anions include:

$C_7H_7SO_3^-$ $SO_4^-$ $Cl^-$ $Ch_3(CH_2)_8CO_2^-$ $C_6H_5CO_2^-$

The fluorinated surfactant and antistatic agent may be derived from the same or different amines.

The compositions are preferably applied from a single solution. Suitable solvents include lower alcohols, e.g., ethanol and isopropanol, which may be diluted with a low boiling fluorocarbon. Preferably the solvent is chosen such that the fluorinated surfactant and antistatic agent have substantially the same solubility so that the dried coating contains the same ratio of constituents as in the applied solution. If there is a substantial difference in the solubilities, nonuniform coatings may result.

The ratio of fluorinated surfactant to antistatic agent in a composition depends upon the intended use.

The concentration of the solutions vary according to their intended use. Preferably the anion molar percent of the fluorinated organic radical is between 1 and 50%, preferably 1.8 and 47.9%, and most preferably between 15 and 40 percent of the mixture of the two ingredients. The present invention has been found to be independent of the specific antistatic composition used, although some, of course, perform better than others because of their physical properties.

The composition of the jacket is immaterial to the practice of the present invention, since triboelectric charging can occur on substantially all solid surfaces. Generally, however, only synthetic resin compositions are used for the major structural components of jackets. These may be either thermoplastic or thermoset resins. Amongst the various resins normally used in the production of jackets are poly(vinyl chloride) and poly(vinyl chloride/vinyl acetate). Of course, dyes, fillers, molding aids and the like may be included within these compositions. Surprisingly, the inclusion of equal or larger quantities of antistatic materials into the composition used for the jacket do not reduce static charging nearly as well as the applied coatings of the present invention, even where the same materials are used.

These and other aspects of the present invention will be shown in the following nonlimiting examples.

EXAMPLE 1

The following formulation was prepared in our laboratory for spray application to poly(vinyl chloride) magnetic record disk jacket:

|  | Parts by Weight |
|---|---|
| Additives |  |
| Piperidinium toluene sulfonate | 0.057 |
| Piperidinium perfluoro-octyl sulfonate | 0.023 |
| Polyethylene glycol 200 | 0.020 |
| Volatile Vehicle |  |
| Freon TF ™ | 75.0 |
| Ethyl alcohol | 25.0 |
| Properties: Clear Solution of 0.1% by weight nonvolatile. |  |

The solution was applied from a Binks Model 69 air spray gun to the vinyl jacket. The electrical potential due to the electrostatic surface charge of the jacket was measured before and after spray treatment by means of a Monroe Model 175 electrostatic voltmeter. After treatment there was no more than 200 volts presented. The treated jacket was subjected to the following conditions:

(1) Rubbed briskly with nylon carpet.
(2) Stored in 5% relative humidity cabinet for three days.

At the end of the test period, the charge level for both conditions remained below 200 volts.

EXAMPLE 2

A poly(vinyl chloride) jacket like that of Example 1 was used in the text procedures of Example 1 after being coated with the following antistatic coating compounds according to the present invention:

(a) cationic, long-chain alkyl (greater than C-12) fatty acid condensate (Sandotex ™ A)

(b) quaternary amine sulfonic acid derivative (Avitex ™ E)

(c) vinyl polymer with quaternary amine pendant groups (DOW ™ ECR 34)

(d) dimethyl allyl ammonium chloride (Calgon ™ E1515), and (e) piperidinium toluene sulfonate (1 part by weight) and piperidinium perfluorooctyl sulfonate (4 parts) as a 0.1% by weight solution in isopropanol.

Each of the antistatic compositions was found to reduce the residual static charge on the jackets to less than 500 volts in less than 20 hours.

What is claimed is:

1. A magnetic record assembly including:
   a magnetic disk of highly electrically insulating, flat, uniform thickness sheet material,
   a jacket of highly electrically insulating material enclosing said disk and having a central opening through it by means of which the disk may be rotatably driven within the jacket and having a slot therein for receiving a magnetic transducer to have a data transferring relationship with the disk and having flat internal faces adjacent to and extending along the faces of said disk,
   a layer of a porous low friction dusting fabric within said jacket and in wiping contact with the faces of said disk as the disk rotates within the jacket, and
   on at least one major surface of the jacket a coating of between 0.5 to 250 micrograms per square inch of a nonvolatile, electrically conductive, organic composition thereon.

2. The assembly of claim 1 wherein said organic composition is on an exterior surface of said jacket.

3. The assembly of claim 1 wherein said organic composition is on every exterior surface of said jacket.

4. The assembly of claim 2 wherein said organic composition is also on an interior surface of said jacket.

5. The assembly of claim 3 wherein said organic composition is also on the interior surfaces of said jacket.

6. The assembly of claim 1 wherein at least twenty-five percent of all interior and exterior surfaces of the jacket are coated with said composition and said composition is nonintegral.

7. The assembly of claim 2 wherein at least seventy-five percent of all exterior surfaces of the jacket are coated with said composition and said composition is nonintegral.

8. The assembly of claim 2 wherein at least seventy-five percent of all interior and exterior surfaces of the jacket are coated with said composition and said composition is nonintegral.

9. The assembly of claim 1 wherein said composition is present in an amount between 0.5 and 250 micrograms per square inch and comprises a material which is selected antistatic compositions from the group consisting of (a) quaternary amines, (b) quaternary phosphines, and perfluorinated ionic compounds.

10. The assembly of claim 2 wherein said composition is present in an amount between 0.5 and 250 micrograms per square inch and comprises a material which is selected antistatic compositions from the group consisting of (a) quaternary amines, (b) quaternary phosphines, and perfluorinated ionic compounds.

11. The assembly of claim 3 wherein said composition is present in an amount between 0.5 and 250 micrograms per square inch and comprises a material which is selected antistatic compositions from the group consisting of (a) quaternary amines, (b) quaternary phosphines, and perfluorinated ionic compounds.

12. The assembly of claim 1 wherein said composition comprises a fluorinated anionic surfactant which is an amine salt of an acid containing a fluorinated organic radical and an antistatic agent which is an ionic salt of an amine.

13. The assembly of claim 2 wherein said composition comprises a fluorinated anionic surfactant which is an amine salt of an acid containing a fluorinated organic radical and an antistatic agent which is an ionic salt of an amine.

14. The assembly of claim 3 wherein said composition comprises a fluorinated anionic surfactant which is an amine salt of an acid containing a fluorinated organic radical and an antistatic agent which is an ionic salt of an amine.

15. The assembly of claim 4 wherein at least seventy-five percent of all interior and exterior surfaces of the cassette are coated with said composition in an amount between 1 and 100 micrograms per square inch and the anion molar percent of the fluorinated organic radical is between 1.8 and 42.9 percent of the mixture of the two ingredients.

16. The assembly of claim 5 wherein at least seventy-five percent of all interior and exterior surfaces of the cassette are coated with said composition in an amount between 1 and 100 micrograms per square inch and the anion molar percent of the fluorinated organic radical is between 1.8 and 42.9 percent of the mixture of the two ingredients.

17. The assembly of claim 7 wherein said composition is present in an amount between 0.5 and 250 micrograms per square inch and comprises a material which is selected antistatic compositions from the group consisting of (a) quaternary amines, (b) quaternary phosphines, and perfluorinated ionic compounds.

18. The assembly of claim 8 wherein said composition is present in an amount between 0.5 and 250 micrograms per square inch and comprises a material which is selected antistatic compositions from the group consisting of (a) quaternary amines, (b) quaternary phosphines, and perfluorinated ionic compounds.

19. The assembly of claim 7 wherein said composition comprises a fluorinated anionic surfactant which is an amine salt of an acid containing a fluorinated organic radical and an antistatic agent which is an ionic salt of an amine.

20. The assembly of claim 8 wherein at least seventy-five percent of all interior and exterior surfaces of the cassette are coated with said composition in an amount between 1 and 100 micrograms per square inch and the anion molar percent of the fluorinated organic radical is between 1.8 and 42.9 percent of the mixture of the two ingredients.

* * * * *